US011974660B2

(12) United States Patent
Clendening

(10) Patent No.: US 11,974,660 B2
(45) Date of Patent: May 7, 2024

(54) PAINT ROLLER COVER CLEANING

(71) Applicant: Jordan Clendening, Souderton, PA (US)

(72) Inventor: Jordan Clendening, Souderton, PA (US)

(*) Notice: Subject to any disclaimer, the term of this patent is extended or adjusted under 35 U.S.C. 154(b) by 0 days.

(21) Appl. No.: 17/879,917

(22) Filed: Aug. 3, 2022

(65) Prior Publication Data

US 2024/0041198 A1 Feb. 8, 2024

(51) Int. Cl.

*B44D 3/00* (2006.01)
*A46B 17/06* (2006.01)
*B08B 3/04* (2006.01)
*B08B 13/00* (2006.01)

(52) U.S. Cl.

CPC .............. *A46B 17/06* (2013.01); *B08B 3/041* (2013.01); *B08B 13/00* (2013.01); *B44D 3/006* (2013.01); *A46B 2200/202* (2013.01)

(58) Field of Classification Search

CPC ... A46B 17/06; A46B 2200/202; B08B 3/041; B08B 13/00; B44D 3/006

See application file for complete search history.

(56) References Cited

U.S. PATENT DOCUMENTS 2,994,330 A * 8/1961 Catlin .................... A45D 24/44 134/107
4,448,209 A * 5/1984 Lindsay ................. B44D 3/006 134/900
7,594,291 B1 * 9/2009 Carmen ................. A46B 17/06 15/21.1
2011/0239482 A1 * 10/2011 Rosa .................. A46B 15/0048 34/58
2012/0118333 A1 * 5/2012 Piccioni ................. A46B 17/06 134/33

* cited by examiner

*Primary Examiner* — Erin F Bergner

(74) *Attorney, Agent, or Firm* — Fox Rothschild LLP; Carol E. Thorstad-Forsyth

(57) ABSTRACT

Cleaning system and method for paint rollers uses a liquid container. A plurality of cage shafts extend into an interior of the container. Each cage shaft supports a cage which is sized and shaped for holding a tubular paint roller. A drive system is configured to mechanically couple a drive shaft to each of the plurality of cage shafts. Rotation of the drive shaft causes a concurrent rotation of the plurality of cage shafts within the container to facilitate cleaning and drying operations.

11 Claims, 5 Drawing Sheets

PAINT ROLLER COVER CLEANING

BACKGROUND

Statement of the Technical Field

The technical field of this disclosure concerns maintenance of equipment used for applying coatings or paints, and more particularly methods and systems for allowing such systems to be efficiently re-used.

Description of the Related Art

The related art concerns methods and systems for re-using equipment associated with the application of paints and other types of coatings. A dip roller system for applying a coating can be comprised of a handle, a frame, and/or a cage over which a roller cover can be placed. The roller cover is often covered with a soft woolly, deep-piled material which will temporarily retain a liquid coating such as paint so that a coating may be applied to a surface. Dip roller systems are commercially available with different size cages to fit a variety of different roller covers. Roller covers having a 9" length extending along an axis of rotation are common, but dip roller systems and roller covers are also available to accommodate roller covers which are smaller or larger. For example, dip roller systems are commercially available which accommodate roller cover lengths of 4", 14", and 18". After painting operations, the coating is usually deeply absorbed or embedded in deep-piled material of the roller cover and therefore is not easily removed. Accordingly, when painting operations are completed, the roller cover is often discarded because cleaning same can be difficult. This can result in wastage of painting roller covers which are otherwise in satisfactory condition.

SUMMARY

This document concerns a system for cleaning paint roller covers. This system can comprise a container for liquid (e.g., a barrel or a drum) which formed of at least one side wall and a base panel. A plurality of cage shafts extend into an interior defined by the container. Each cage shaft extends along a shaft axis and supports a cage which is sized and shaped for holding a tubular paint roller cover so that a roller cover axis is aligned with the shaft axis. A drive system is configured to mechanically couple a drive shaft to each of the plurality of cage shafts. The configuration can be such that rotation of the drive shaft causes a concurrent rotation of the plurality of cage shafts within the container. In some scenarios the system includes a lid configured for enclosing a major aperture of the container when the lid is positioned to cover the major aperture.

According to one aspect, the base panel of the container can comprise a plurality of cage shaft apertures. The cage shafts respectively extend through these apertures into the interior of the container. Further, each cage shaft aperture can comprise a seal configured to prevent liquid from escaping the interior of the container when a fluid is disposed within the container.

The drive system can be disposed in a drive housing adjacent to the base panel of the container. In such a scenario, the cage shafts can extend through the base panel to engage the drive system. In some embodiments, the drive shaft extends to exterior of the container and may have an end coupling disposed external of the container. The end coupling is advantageously configured to facilitate motorized rotation of the drive shaft using a tool. For example, a portable power tool, such as a cordless drill, can be used for this purpose. However, the solution is not limited in this regard and in other embodiments the drive system further comprises an electric motor disposed within a drive housing of the cleaning system. The drive shaft is coupled to the electric motor within the drive housing.

The system can be manually operated by controlling the operation of a portable power tool and/or an electric motor disposed within the drive housing. However, the solution is not limited in this regard and in some scenarios may comprise an electronic control unit. The control unit can be configured to control the operation of various system elements including the electric motor. In some embodiments, the control unit is configured to selectively vary one or more of a rotation duration, rotation speed, and rotation direction of the cage shafts to facilitate at least one of cleaning and drying the plurality of roller covers.

The system can be further automated with one or more remotely controlled flow valves. These remotely controlled flow valves can be configured to selectively facilitate a flow of liquid. The operation of the controlled flow valves can be determined by the control unit. Accordingly, the control unit can selectively control at least one of an ingress and egress of liquid into the container.

Embodiments also concern a method for at least partially refurbishing paint roller covers after they have been used. This refurbishing process can involve one or more of cleaning the soft wooly exterior of the rollers and/or partially restoring a nap of such exterior. The method can begin by positioning a plurality of paint roller covers respectively on a plurality of cages sized and shaped for holding the paint roller covers. The roller covers can be positioned so that a roller cover axis of each paint roller cover is aligned with a shaft axis of a cage shaft on which the cage is mounted. In some embodiments, the method can involve positioning a lid on the container after the roller covers are installed or mounted on the cages.

The process can continue by cleaning the paint roller covers using a motor and a mechanical drive system. The motor/drive system is configured to rotate each of the cage shafts so that the roller covers disposed on the cages are rotated in a liquid cleaning solution disposed within a container. In some scenarios, the method can involve removably attaching a power tool to a drive shaft of the drive system and using the power tool to cause the rotation of the plurality of cages. In such scenarios, the power tool may comprise the motor for the drive system and its operation can be manually controlled by a user.

When the cleaning process is completed, the liquid cleaning solution is removed from the container. Thereafter, the process continues with a step which involves drying the paint roller covers. This involves using the motor and the mechanical drive system to rotate the plurality of cages within the empty container. By rotating the cages, the roller covers mounted on the cages are also rotated. Consequently, a liquid cleaning solution can be removed from the roller cover by application of a centrifugal force.

In some embodiments, the cleaning, removing and drying actions described above can be performed automatically in response to an electronic control unit. For example, the container can be automatically filled with the liquid cleaning solution to a predetermined fill level before or after the paint roller covers have been positioned on the cages. In such scenarios, the control unit can automatically operate at least one remotely controlled valve to permit an ingress of the liquid cleaning solution into the container. The control unit can utilize at least one sensor to determine when a sufficient amount of the liquid cleaning solution has entered and is present in the container. In some scenarios, the control unit can also automatically operate at least one remotely controlled drain valve to facilitate removing the liquid cleaning solution from the container.

In an automated type of cleaning system as described above, the control unit can selectively control one or more of a duration and a speed of the rotation of the plurality of cages. For example, the speed of rotation may be varied by the control unit in accordance with a predetermined pattern to facilitate drying of the roller covers.

BRIEF DESCRIPTION OF THE DRAWINGS

This disclosure is facilitated by reference to the following drawing figures, in which like reference numerals represent like parts and assemblies throughout the several views. The drawings are not to scale and are intended for use in conjunction with the explanations in the following detailed description.

DETAILED DESCRIPTION

Figure 1:
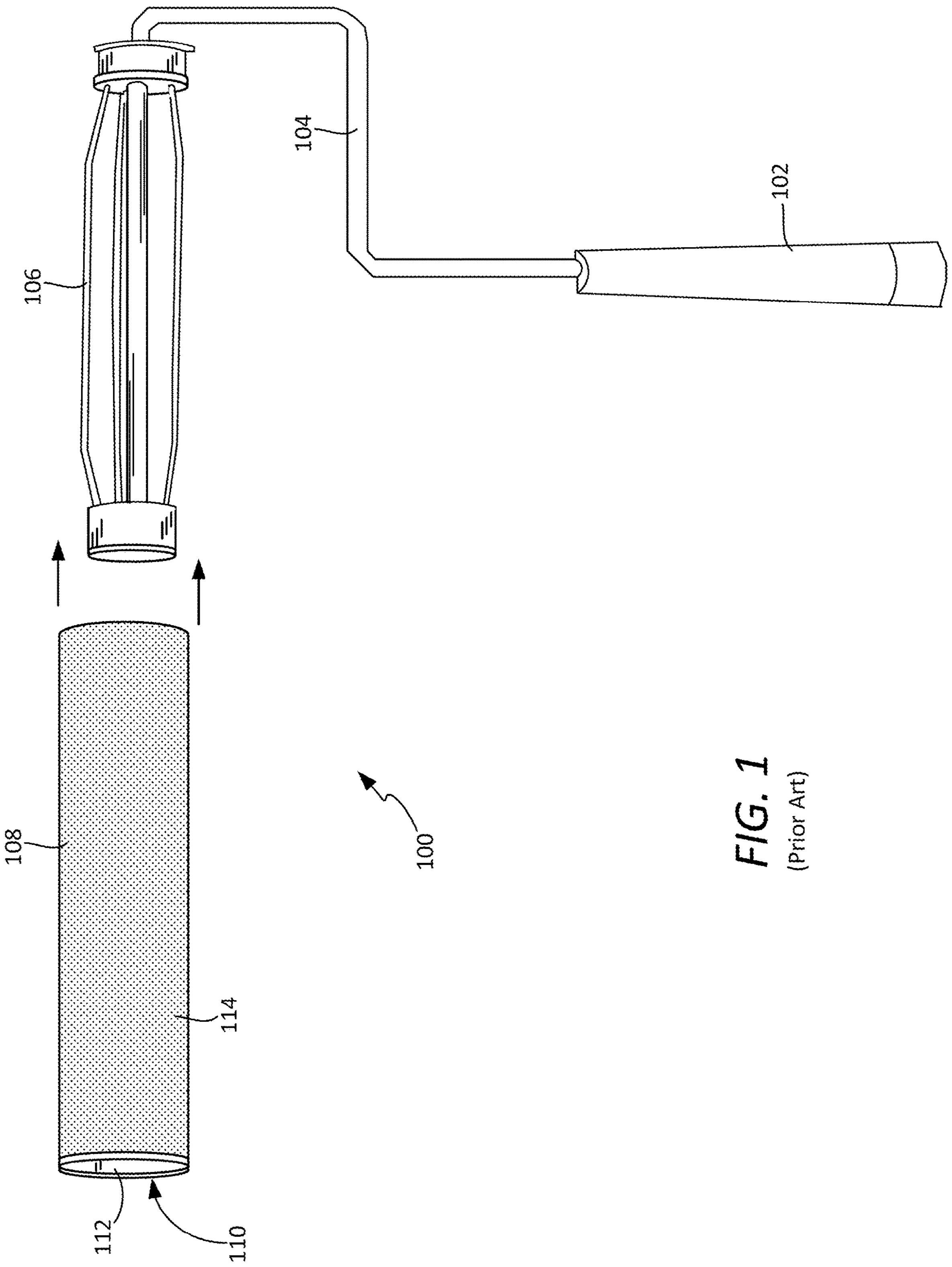
FIG. 1 (Prior Art)
FIG. 1 is a perspective view showing a roller system for applying paint or other types of coatings.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. Further, particular features described herein can be used in combination with other described features in each of the various possible combinations and permutations. It is noted that various features are described in detail with reference to the drawings, in which like reference numerals represent like parts and assemblies throughout the several views. While the various aspects are presented in the drawings, the drawings are not necessarily drawn to scale unless specifically indicated.

The methods and/or systems disclosed herein may provide certain advantages relating to the process of cleaning of equipment used for applying coatings such as paint. According to one aspect, a system and method is provided for rapidly and efficiently cleaning one or more paint roller covers without any of the usual paint splatter and/or mess.

Referring now to FIG. 1 there is illustrated a dip roller system 100 for applying a coating. The dip roller system can be comprised of a handle 102, a frame 104, and a cage 106 over which a roller cover 108 can be placed. The cage 106 is configured to engage an interior lumen 110 of the roller cover 108 so that the roller cover may be removably fixed in position on the cage. In some scenarios, the cage 106 is formed of wire rods or other structure which resiliently or frictionally engage an inner wall 112 of the roller cover defined by the lumen 110. The roller cover 108 is often covered with a soft woolly, deep-piled material 114 which will temporarily retain a liquid coating such as paint so that a coating may be applied to a surface. Dip roller systems are commercially available with cages 106 which are designed to accommodate roller covers of various axial lengths such as 4", 9", 14" or 18" without limitation.

Figure 2:
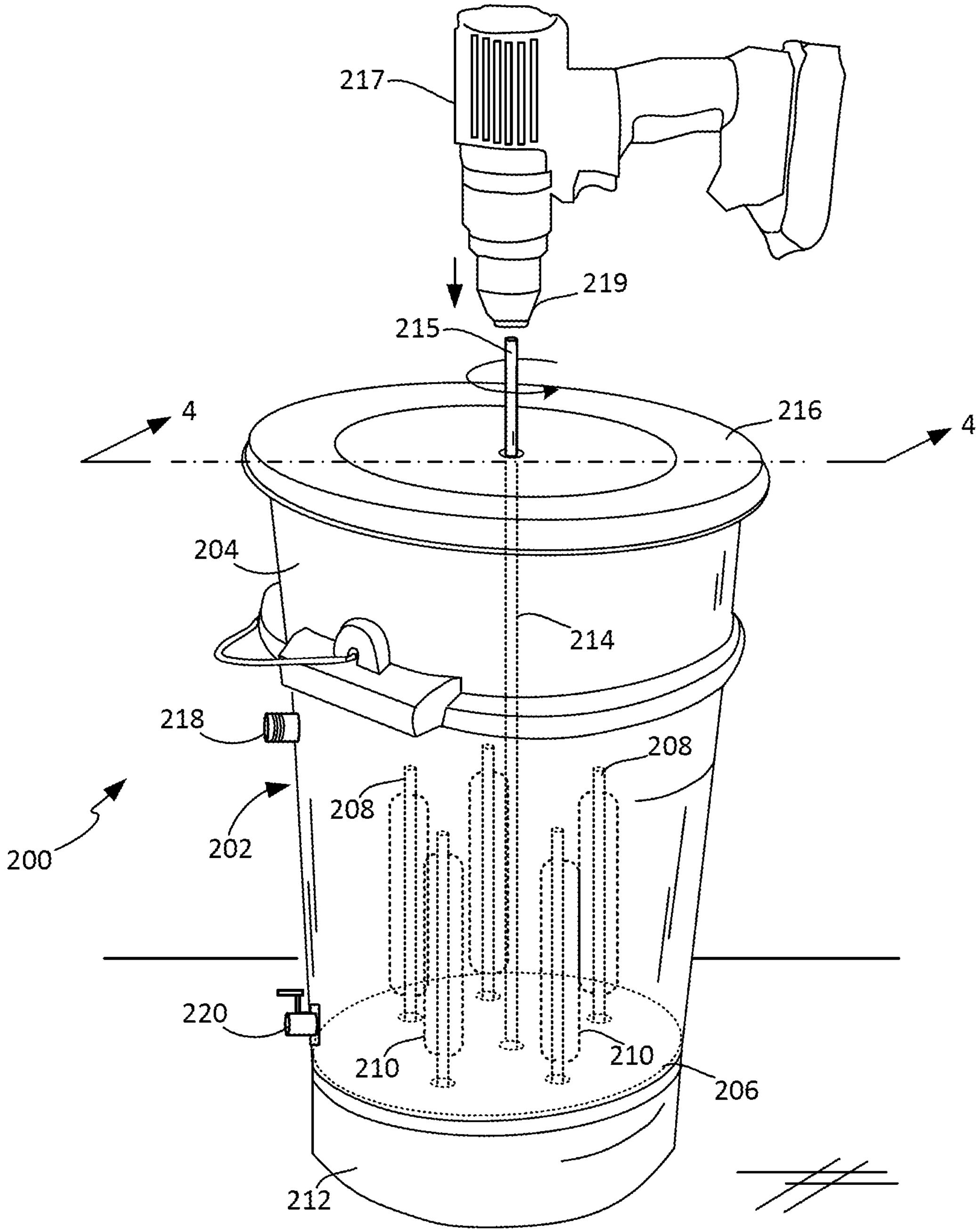
FIG. 2 is a side perspective view of a paint cleaning system which is useful for understanding certain embodiments disclosed herein.
Figure 3:
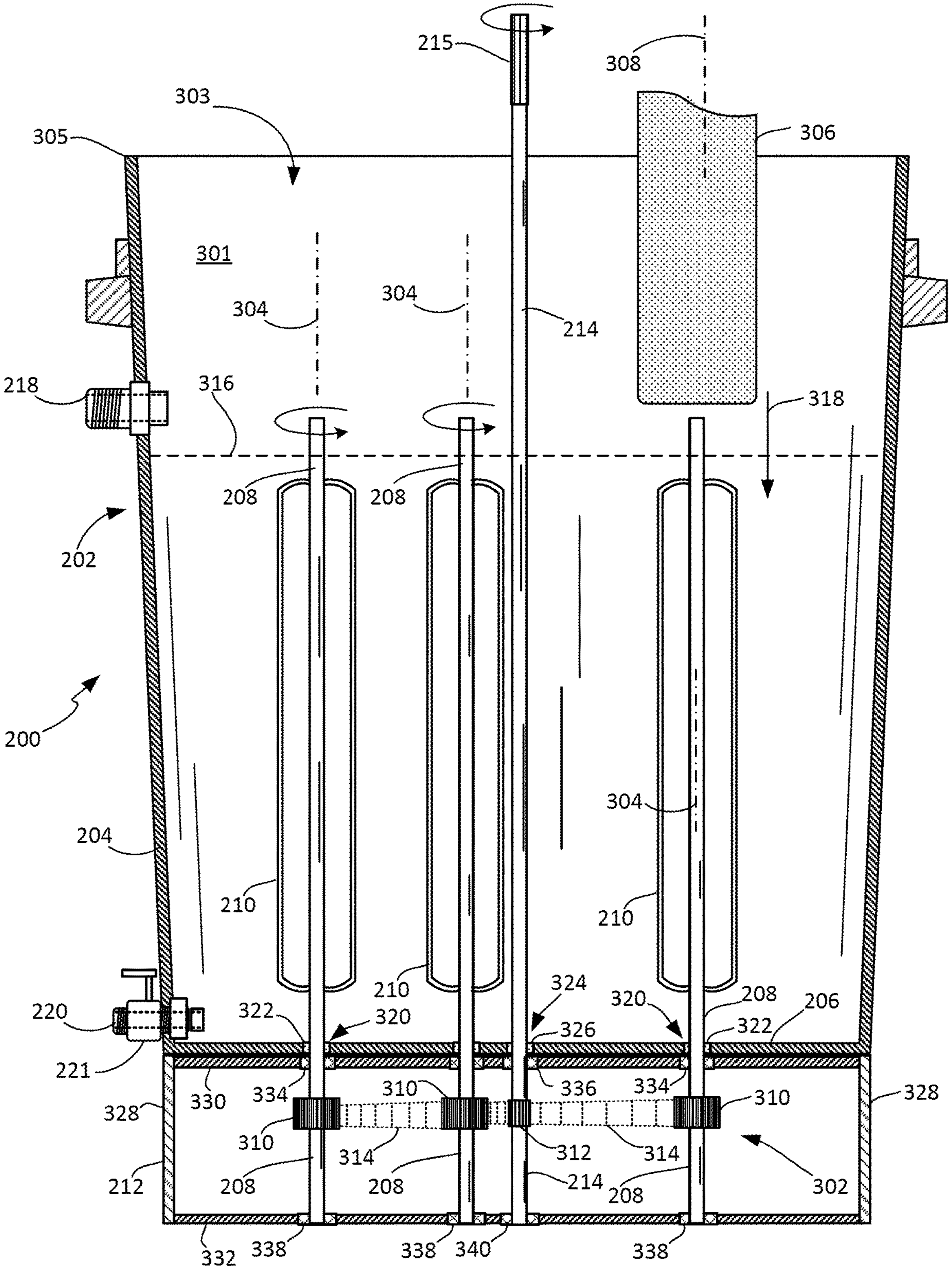
FIG. 3 is a cross-sectional view of the paint cleaning system of FIG. 2 with the lid removed, taken along line 3-3 in FIG. 2.

A perspective view of a cleaning system 200 for one or more roller covers is shown in FIG. 2. Shown in FIG. 3 is a cross-sectional view of the cleaning system 200 with the lid 216 removed, taken along line 3-3 in FIG. 2. The cleaning system 200 is comprised of a watertight liquid container 202 that is formed of at least one side wall 204 and a base panel 206. In some scenarios, the container 202 can be a hollow tubular structure in the form of a drum or barrel. However, the solution is not limited in this regard and other container shape configurations are also possible. For example, the container can in some scenarios have the shape of rectangular prism.

According to one aspect, the container 202 defines a major aperture 303 through which the interior 301 can be accessed. For example, the major aperture 303 can be a top opening in a drum or barrel which is opposed from the base panel 206. In some scenarios, a peripheral edge of the major aperture 303 can be defined by a rim or lip 305 defined along an edge of the at least one side wall 204 opposed from the base panel 206. The cleaning system can also include a lid or cover panel 216 (not shown in FIG. 3) which is configured for enclosing the major aperture 303 when the lid 216 is positioned to cover the major aperture.

In some scenarios, the container 202 can have a hose coupling or port 218 to facilitate adding a fluid (such as water) to the interior 301 of the container. Similarly, the container 202 can have a hose coupling or port 220 to facilitate draining of fluid from the interior 301 of the container. The hose coupling 220 may be operated by a valve 221 so as to control when water is permitted to drain or accumulate in the container. A plurality of cage shafts 208 extend into an interior 301 defined by the at least one side wall 204 and base panel 206 of the container. Each cage shaft 208 extends in a direction defined by a shaft axis 304 and supports a cage 210. The base panel 206, cage shafts 208 and cages 210 are shown in phantom lines in FIG. 2 so as to facilitate a greater understanding of the system.

Shown in FIG. 3 is a cross-sectional view of the paint cleaning system with the lid 216 removed, taken along line 3-3 in FIG. 2. It may be observed in FIG. 3 that each of the cages 210 are sized and shaped for holding a tubular paint roller cover 306 so that a roller cover axis 308 is aligned with the shaft axis 304. In some scenarios, the cages 210 can have a configuration similar to a cage 106 as used in a dip roller system 100. As such, each cage 210 can be configured to engage an interior lumen of a roller cover so that the roller cover may be removably fixed in position on the cage. In some scenarios, each cage 210 can be formed of wire rods or other structure which resiliently or frictionally engage an inner wall of the roller cover defined by the lumen. However, the exact configuration of the cage is not critical and other types of cage configurations are also possible. For example, in some scenarios the cage 210 can be a tubular structure formed of a metal or plastic material. In other scenarios, the cage 210 can be a retention system configured to clamp the inside or outside of the roller cover so that it is held in axial alignment with respect to the cage shaft 208.

With the lid 216 removed or opened, one or more paint roller covers 306 can be mounted on the cages 210 within the interior of the container 202. For example, the roller covers can be urged onto the cages 210 by axially aligning the roller cover with the cage and then urging the roller cover in the direction indicated by arrow 318. Only a portion of one roller cover 306 is shown in FIG. 3 so as to facilitate greater clarity in the drawing. However, it should be understood that the entire length of the roller cover 306 may be positioned fully over the cage 210 so that the roller cover may be securely retained. When the roller cover 306 is mounted on the cage 310 it can be fully immersed in a liquid (such as water) when the liquid is added to the container 202 up to a fill line 316 intermediate of the base panel and the lid. Additional roller covers 306 may similarly be positioned concurrently on the remaining cages 210 within the container. Accordingly, the cleaning system can facilitate cleaning of a plurality of the roller covers at the same time.

The cleaning system 200 also includes a drive system 302. In some scenarios, the drive system 302 can be disposed in a drive housing 212 disposed adjacent to the container 202. In the embodiment shown in FIGS. 2-3 the drive housing 212 is disposed adjacent to the base panel 206, directly beneath the container 202. This arrangement is advantageous as it makes the overall cleaning system relatively compact. It also allows simplifies the design of the system since the cage shafts 208 can extend directly into the drive housing 212 after passing through the base panel 206. Of course, embodiments are not limited in this regard and other positions of the drive system 302 relative to the container 202 are possible. The drive system 302 can also include a drive shaft (e.g., drive shaft 214) through which motive power is provided to operate the drive system 302. In an embodiment shown in FIGS. 2 and 3, the drive shaft extends from the drive system 302, into the interior of the container 202, and then out of the container through a shaft aperture defined in the lid 216. The drive shaft 214 can terminate external of the container at an end coupling 215.

The base panel 206 can include a plurality of cage shaft apertures 320 which allow the cage shafts 208 to extend through the base panel 206. Each cage shaft aperture can have a seal 322 (e.g., a wiper seal) configured to prevent liquid from escaping the interior 301 when a fluid is disposed within the watertight container 202. Similarly, base panel 206 can include a drive shaft aperture 324 which allows the drive shaft 214 to extend through the base panel 206. The drive shaft aperture 324 can have a seal 326 (e.g., a wiper seal) configured to prevent liquid from escaping the interior 301 when a fluid is disposed within the watertight container 202.

The drive housing 212 can comprise one or more support walls 328 which help to support the container 202 in a position above the drive housing. The drive housing 212 can also include a proximal bearing wall 330 which is proximal to the base panel 206, and a distal bearing wall 332 which is distal from the base panel 206. After passing through the base panel 206, the drive shaft 214 and the cage shafts 208 can extend directly into the drive housing 212 through the proximal bearing wall 330. Each of the cage shafts 208 and the drive shaft (e.g., drive shaft 214) can be journaled in bearings 334, 336 mounted in the proximal bearing wall 330, and in bearings 338, 340 mounted in distal bearing wall 332.

The drive system 302 is configured to mechanically couple a drive shaft (e.g., drive shaft 214) to each of the plurality of cage shafts 208, whereby rotation of the drive shaft causes a concurrent rotation of the plurality of cage shafts within the container. The drive system can employ any suitable mechanical coupling arrangement to facilitate this operation. In the embodiment shown in FIG. 3, a belt drive type of system is used. More particularly, a sprocket 310 can be fixed in a predetermined position on each of the cage shafts 208. A sprocket 312 can also be fixed on the drive shaft (e.g., drive shaft 214). A flexible indented or perforated item such as a chain or belt 314 concurrently engaging with the sprocket 312 and sprockets 310 can allow the sprocket 312 to urge rotation of the sprockets 310. In some scenarios, the chain or belt 314 can be set up in a serpentine configuration to engage with each of the sprockets 310 and 312. As such, the drive shaft (e.g., drive shaft 214) when rotated can cause concurrent rotation of the plurality of cage shafts 208. The foregoing arrangement is one example of a drive system 302, but it should be understood that other alternatives are possible without limitation. For example, in some scenarios, one or more gears (not shown) can be used to couple the drive shaft 214 to the cage shafts 208, whereby the cage shafts may be caused to rotate in conjunction with the drive shaft.

When one or more roller covers 306 are to be cleaned, the roller cover(s) can be mounted on the one or more cages 210. This can be accomplished by temporarily removing or opening the lid 216 and then positioning the roller covers 306 as described herein. Once the roller covers 306 are properly positioned, the lid 216 can be repositioned on the major aperture 303 of the container to form a seal (e.g., at the container rim or lip 305). This will prevent cleaning solution and/or paint from the rollers from escaping the container.

Before or after the roller covers 306 are mounted on the cages, a cleaning or rinsing solution such as water can be added to the interior of the container 202 so that the roller covers are immersed in the cleaning or rinsing solution. In some scenarios, the hose coupling 218 can be used for this purpose. Thereafter the drive shaft 214 can be rotated to cause a spinning action of each cage 210. This spinning action can in turn cause the rotation of each cage-mounted roller cover 306 about a roller cover axis 308. In some scenarios, the drive shaft 214 can be rotated manually with the use of a crank handle (not show) that is fitted to the end coupling 215. However, in other scenarios, the rotation of the drive shaft 214 is advantageously facilitated using a power tool. For example, the power tool can be a corded or cordless style drill 217 having a chuck 219 that is capable of securely receiving the end coupling 215 therein.

After spinning the roller covers 306 as described for a period of time, the cleaning solution can be drained from the container 202. In some scenarios, this draining operation can be facilitated using the hose coupling 220 adjacent to the bottom panel 206. The cleaning process as described can then end or may be repeated any number of times by refilling the container 202 with fresh cleaning solution and repeating the spinning of the roller covers 306. After the cleaning of the roller covers 306 is completed, they can be dried. The drying process can involve draining the cleaning solution from the container 202 and once again operating the drive shaft 214 to spin each of the roller covers 306 about a respective roller cover axis 308. The resulting centrifugal force will remove excess water from the soft woolly deep-piled material which lines each roller cover 306. When drying operations are completed, the roller covers 306 can be removed from the cages 210 or stored in the unit (e.g., on the cages 210) to keep them moist and save space.

Figure 4:
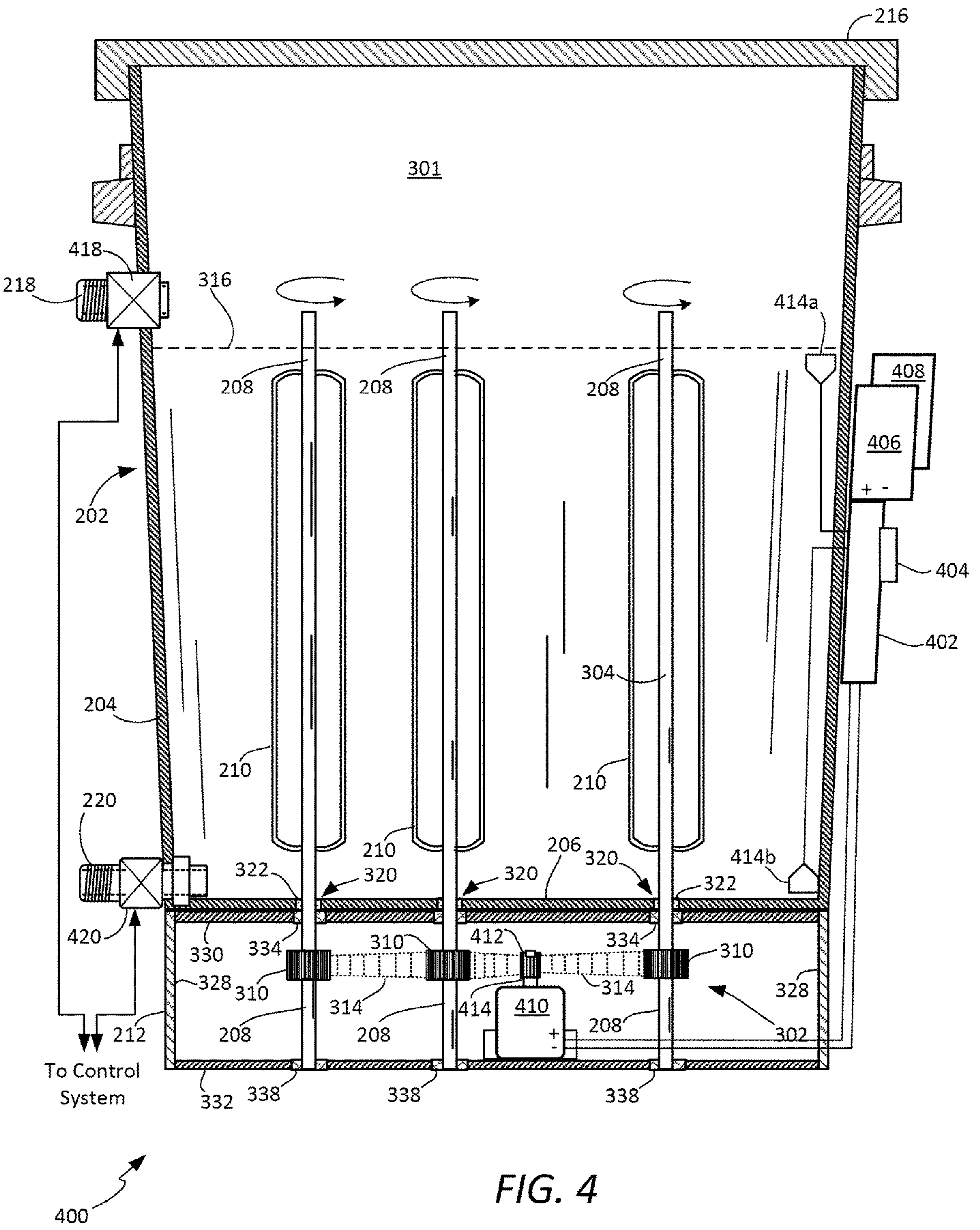
FIG. 4 is a cross-sectional view of an alternative embodiment paint cleaning system.

An alternative embodiment cleaning system 400 is shown in FIG. 4. The embodiment shown in FIG. 4 is similar to the cleaning system 200 but is different in some ways which are hereinafter described. The cleaning system 400 can includes one or more of a control unit 402 which may include a user interface 404, an integrated battery connector 406 which can facilitate connection to of the control unit to a power source such as battery 405, an integrated motor 410 which drives a sprocket 412, remotely controlled valves 418, 420, and one or more sensors (e.g., a first sensor 414*a*, and a second sensor 414*b*). The control unit 402 can in some scenarios be implemented as a microcontroller programmed with a set of instructions for carrying out one or more of the operations described herein. The user interface 404 can be as minimal as an on-off switch to initiate a cleaning operation. However, in other scenarios, the user interface 404 can include one or more keys, switches, or a touchscreen to facilitate control of the cleaning system operation. The integrated battery connector 406 can be any suitable connector but in some scenarios can be configured to be compatible with a standardized battery configuration used in one or more commercially available power tools. The remotely controlled valves can be operated by any suitable means. In some scenarios the remotely controlled valves can be electronically controlled (e.g., controlled by a solenoid or electric motor) but other solutions are possible without limitation. For example, in some scenarios, the valves can be controlled pneumatically using pressurized air from a source of pressurized air or may be hydraulically controlled using hydraulic fluid.

The motor 410 is electronically coupled to the control unit 402 so that its operation is determined in accordance with electronic signals or electrical power received from the control unit 402. The operation of the remotely controlled valves 418, 420 is similarly under the control of the control unit 402. Accordingly, one or more of the ingress of a cleaning solution into the container 202 through hose coupling 218, the draining of the cleaning solution from the interior of the container through the hose coupling 220 and the cycle time(s) during which the cages 210 are rotated in the cleaning solution can be fully automated. The first sensor 414*a* (e.g., a max-fill water level sensor) can be configured to detect when a fluid level in the container is at or near a fill line 316. In some scenarios, this first sensor 414*a* can be located in or on a wall of the container 202 near the fill line 316. A second sensor 414*b* (e.g., a water drain sensor) can be used to detect when a fluid has been sufficiently drained from the container to permit drying operations to begin. The second sensor 414*b* can be located near the base panel 206. Of course, the solution is not limited in this regard and in other scenarios, a single sensor (e.g., a sensor utilizing optical, ultrasonic or mass sensing methods) can be used to detect fluid level generally within the container. With the foregoing arrangement, the control unit 402 is able to detect when the container is full of fluid, when the fluid has been completely drained. Based on this information, the control unit 402 can selectively operate the remotely controlled valves 418, 420 during each cleaning cycle to add cleaning fluid or drain cleaning fluid from the container 202.

A drying operation can occur after the cleaning fluid is drained from the container 202 and, like the washing operation, can be fully automated. The drying operation can comprise a drying cycle which may involve selectively controlling rotation of the cages 210. For example, the control unit 402 can control a duration time and/or a rotation speed of the cages 210 during each drying cycle. The control unit 402 can also control the number of drying cycles which are executed during each drying operation to provide more or less drying of the roller covers.

Figure 5:
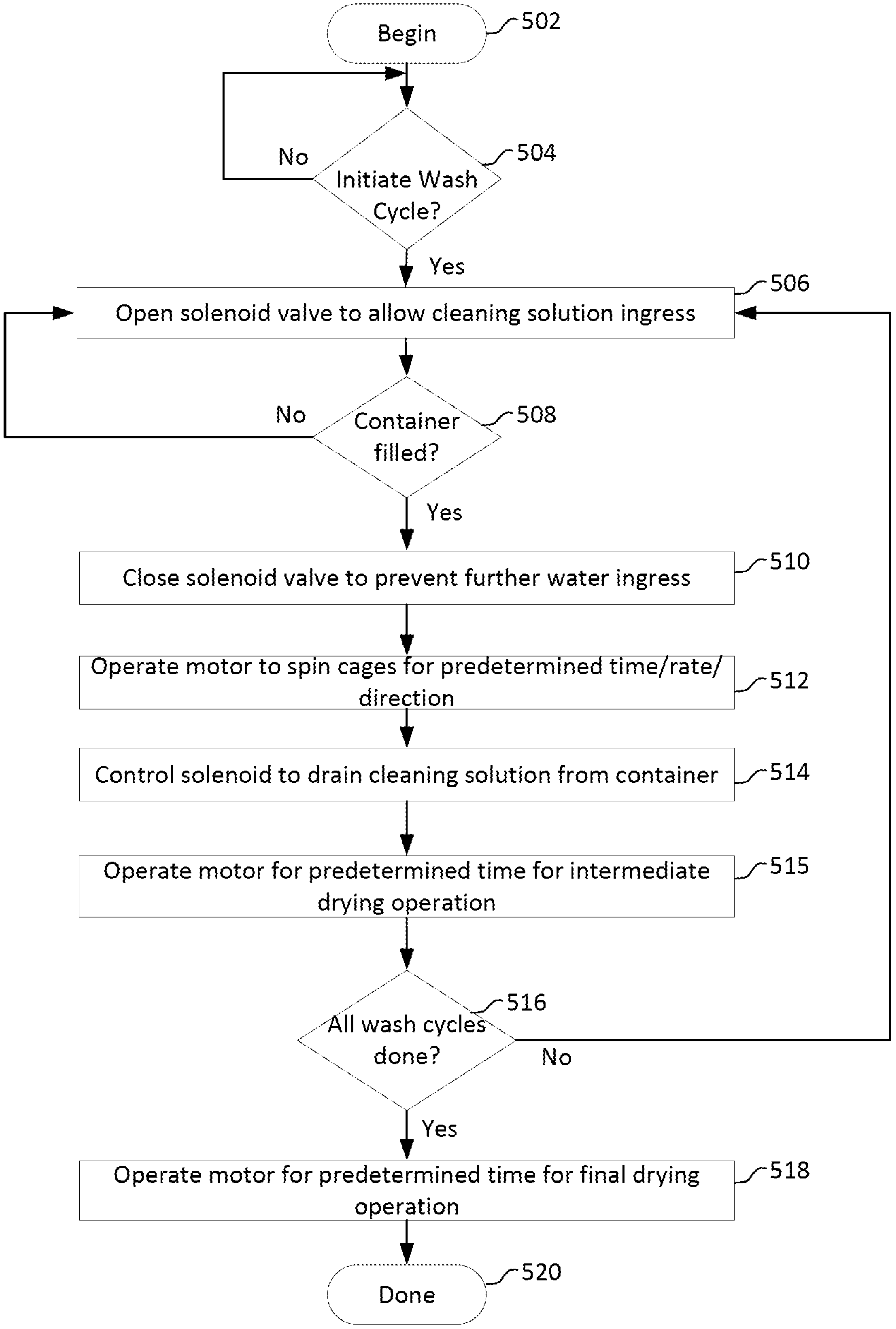
FIG. 5 is a flow chart that is useful for understanding certain automated operations that can be performed by the cleaning system of FIG. 4.

A flowchart is provided in FIG. 5 which is useful for understanding an exemplary operation of the cleaning system 400. The process begins at 502 and continues on to 504 where the control unit 402 determines whether a command has been received to initiate a wash cycle. For example, such a command can be input by a user utilizing the user interface 404. If a wash command has been received (504: Yes) then the process continues to 506 where the control unit 402 causes a first remotely controlled valve (e.g., remotely controlled valve 418) to open whereby a cleaning solution, such as water, is permitted to enter the container 202.

At 508 a determination is made by the control unit 402 as to whether the container has been sufficiently filled with the cleaning solution. This determination can be facilitated by evaluating inputs at the control unit from one or more sensors 414. If the container 202 is not sufficiently full (508: No) then the first remotely controlled valve remains open, and fluid continues to fill the container 202. Once the container 202 has sufficiently filled ((508: Yes) the process continues at 510 where the control unit 402 causes the first remotely controlled valve to close so as to prevent further water ingress.

Thereafter, the control unit 402 can at 512 initiate operation of the motor 410 to cause the cages 210 to spin within the cleaning solution. This step can involve causing the motor to operate for predetermined time(s), at one or more predetermined rotation speed(s), and in different directions to achieve maximum cleaning effect. When motor operations are completed, the control unit 402 can operate a second remotely controlled valve (e.g., remotely controlled valve 420) to drain the cleaning solution from the container. When the control unit senses that the cleaning solution has been sufficiently drained, a determination can be made as to whether all wash cycles are complete. For example, in some scenarios a user may use the user interface 404 to specify that the wash cycle is to be repeated a predetermined number of times. In some scenarios, the process can involve an intermediate drying cycle 515 after each drain cycle. This intermediate drying cycle 515 can involve rotation or spinning of the cages for a predetermined duration of time at a controlled rotation speed which in some instances may vary during the predetermined rotation.

If all of the wash cycles are not yet completed (516: No), then the process can return to 506 for execution of additional wash cycles. However, if all wash cycles are complete (516: Yes) then the process may continue on to 518 to begin a drying cycle. The drying cycle can involve using the control unit 402 to cause the motor to operate for one or more predetermined time duration(s), at one or more different rotation speed(s) and in different directions to achieve maximum drying effect. When the drying cycle is completed, the process terminates at 520.

In addition to the convenience and cost savings achieved by the system and method described herein, a further advantage can be potentially achieved with regard to restoration. The soft woolly, deep-piled material on the outside of a roller cover will often comprise a nap consisting of raised hairs, threads, or similar small projections on the surface of the roller cover. During use of the roller for applying a coating, the nap can become matted or compressed so that the roller cover no longer retains as much coating material and/or the texture of the applied coating may change. This compression or matting of the material may remain when the roller cover is merely rinsed with water and allowed to dry. In contrast, the spin cleaning and subsequent spin drying of the roller covers as described herein can at least partially restore the roller cover to its original condition. In particular the centrifugal forces applied to the roller during the cleaning and subsequent drying process can potentially raise a nap of the wooly deep piled material in ways that are not achievable with conventional roller cover cleaning and drying methods.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. A method for at least partially refurbishing paint roller covers after they have been used, comprising:

inserting a first paint roller cover inside a container disposed on a drive housing;

positioning the first paint roller cover on a first cage of a plurality of cages which are mounted inside the container, wherein each of the cages is mounted on a cage shaft that extends in a direction towards a top of the container, through a first aperture formed in the drive housing, through a second aperture formed in a base panel of the container so as to be aligned with the first aperture, and into a major aperture of the container;

using the first cage to hold and align a roller cover axis of the first paint roller cover with a shaft axis of the cage shaft on which the first cage is mounted;

cleaning the first paint roller cover using a motor and a mechanical drive system, wherein the mechanical drive system is disposed in the drive housing and is coupled to the cage shafts to facilitate rotation of the plurality of cages in a liquid cleaning solution disposed within the container;

removing the liquid cleaning solution from the container; and drying the first paint roller cover by using the motor and the mechanical drive system to rotate the first cage within the container after the liquid has been removed whereby the liquid cleaning solution is removed from the first roller cover by a centrifugal force.

2. The method of claim 1, wherein one or more of the cleaning, removing and drying are performed automatically in response to an electronic control unit.

3. The method of claim 2, wherein the removing comprises automatically operating at least one control valve in response to the control unit to drain the liquid cleaning solution from the container.

4. The method of claim 2, further comprising filling the container with the liquid cleaning solution to a predetermined fill level before or after the first paint roller cover has been positioned on the first cage.

5. The method of claim 4, further comprising using the control unit to automatically operate at least one valve to control an ingress of the liquid cleaning solution into the container.

6. The method according to claim 5, further comprising using the control unit and at least one sensor to determine when a sufficient amount of the liquid cleaning solution is present in the container.

7. The method according to claim 4, further comprising using the control unit to automatically operate at least one drain valve to facilitate removing the liquid cleaning solution from the container.

8. The method according to claim 2, further comprising using the control unit to selectively control one or more of a duration and a speed of the rotation of the plurality of cages.

9. The method according to claim 8, wherein the speed of rotation is varied by the control unit in accordance with a predetermined pattern to facilitate drying of the paint roller covers.

10. The method according to claim 1, further comprising placing a cover on the container prior to the cleaning and drying operations.

11. The method according to claim 1, further comprising removably attaching a power tool to a drive shaft of the mechanical drive system and using the power tool to cause the rotation of the plurality of cages.

* * * * *